United States Patent
Wu et al.

(10) Patent No.: US 7,382,751 B1
(45) Date of Patent: Jun. 3, 2008

(54) CDMA SYSTEM WITH SEPARATE FUNCTION CHANNEL CARD

(75) Inventors: Kuang-Shyr Wu, Taoyuan Hsien (TW); Yin-Kuan Lin, Taoyuan Hsien (TW); Ming-Shan Peng, Hsinchu Hsien (TW)

(73) Assignee: Chung-Shan Institute of Science and Technology, Taoyuan (TW)

( * ) Notice: Subject to any disclaimer, the term of this patent is extended or adjusted under 35 U.S.C. 154(b) by 1779 days.

(21) Appl. No.: 09/633,828

(22) Filed: Aug. 7, 2000

(51) Int. Cl.
*H04B 7/216* (2006.01)
(52) U.S. Cl. .................................................. 370/335
(58) Field of Classification Search ............... 370/294, 370/310.2, 312, 315, 328, 334, 339, 313, 370/314, 329, 330, 336, 337, 352, 354, 356, 370/436, 401, 437, 480, 442, 478
See application file for complete search history.

(56) References Cited

U.S. PATENT DOCUMENTS

| | | | | |
|---|---|---|---|---|
| 5,418,838 A | * | 5/1995 | Havermans et al. | 455/465 |
| 6,137,793 A | * | 10/2000 | Gorman et al. | 370/360 |
| 6,490,256 B1 | * | 12/2002 | Jones et al. | 370/277 |

* cited by examiner

*Primary Examiner*—Brenda Pham
(74) *Attorney, Agent, or Firm*—J.C. Patents

(57) ABSTRACT

A code division multiple access (CDMA) system having a separate channel card function architecture. The CDMA system includes a back-haul interface module, a controller of a cable network controlling station, a main channel card, a middle frequency module, a radio frequency module, a reception channel card, a random access card, a clock module and a cell controller. The main channel card is responsible for controlling signal transmission while the reception channel card is responsible for signal reception. By separately processing data at a reception terminal and a transmission terminal, similar computations can be processed as groups so that hardware design of the system is very much simplified and signal interference is greatly reduced.

8 Claims, 3 Drawing Sheets

CDMA SYSTEM WITH SEPARATE FUNCTION CHANNEL CARD

BACKGROUND OF THE INVENTION

1. Field of Invention

The present invention relates to a code division multiple access (CDMA) system for network communication. More particularly, the present invention relates to a CDMA system whose data reception and data transmission are carried out using different channel cards.

2. Description of Related Art

Due to rapid advancements in communication technologies, the number of mobile telephone users is increasing at a lighting pace. To improve the quality of communication, better communication techniques (such as wide band networks) are developed along with the construction of more base stations.

FIG. 1 is a block diagram showing a conventional CDMA system. As shown in FIG. 1, an antenna 10 is used to receive radio frequency signals emitted by a particular user or to broadcast radio frequency signals to users. A radio frequency module 12 is a device that converts any received middle frequency signals into radio frequency signals and then transmits the radio signal from the antenna 10. Similarly, the radio frequency module also converts the radio frequency signals picked up by the antenna 10 into middle frequency signals.

A middle frequency module 14 is an interface that takes care of input/output functions between the radio frequency module 12 and a plurality of channel cards 16. Each channel card 16 comprises a digital/analogue converter 18, an application specific integrated circuit/field programmable gate array 20 and a processor 22. The channel card 16 processes base-band digital signals. The digital/analogue converter 18 inside the channel card 16 is responsible for converting base-band digital signals to analogue middle-frequency signals and then transmitting to the middle frequency module 14. Similarly, the digital/analogue converter 18 is also responsible for converting analogue signals from the middle frequency module 14 into base-band digital signals to be used by the channel card 16.

The application specific integrated circuit/field programmable gate array 20 serves many functions inside the channel card 16 including power control, code spreading/de-spreading, modulation/demodulation, combining modules, Gold/Walsh code generation, RAKE receiver, peak detection, tracking loop, automatic frequency control, channel estimation and receiver synchronization.

Besides a power control function, the processor 22 inside the channel card 16 performs cyclic redundancy check, cyclic redundancy check decoding, convolution encoding, rate matching, rate matching decoding, interleaving encoding, bus connection between channel card and channel master, Viterbi decoding and interleave decoding.

A back-haul interface module 24 takes care of the input/output transmission between the channel cards 16 and a controller 26 of a cable-network control station. The controller 26 functions as an electronic signal switcher.

In a CDMA communication station design, base-band digital signal processing is a critical technique. However, a number of technical problems are often encountered in the design of a CDMA communication station, including: (1) each channel card has to process signal reception and signal transmission independently; however, due to the concentration of output terminals (such as middle frequency module, radio frequency module and antenna), various channel cards have to exchange data with each other between reception and transmission; hence, complicated channel combining computations (energy-contained control) must be processed by the same processor/application specific integrated circuit leading to overloading and complexity of transmission signals in each channel card; (2) each channel card must be able to receive all the information from the other channel cards for transmission integrity; hence, extra hardware must be available to deal with coding/decoding and error correction leading to design complication for each channel card; (3) When various channel cards transmit middle frequency signals to the middle frequency module, due to the simple interference of the buses from the various channel cards to the middle frequency module and the concentration of various channel card components, transmission errors are very difficult to rectify; hence, system reliability is low.

SUMMARY OF THE INVENTION

Accordingly, one object of the present invention is to provide a code division multiple access (CDMA) channel card architecture that includes a main channel card for controlling signal transmission and a plurality of general-purpose channel cards for controlling signal reception. By separating the signal transmission function from the signal reception function in this way, data paths can be optimized and signal interference can be reduced. Hence, hardware design is simplified.

To achieve these and other advantages and in accordance with the purpose of the invention, as embodied and broadly described herein, the invention provides a CDMA system having a separate channel card architecture. The CDMA system includes a back-haul interface module connected to a controller in a cable network controlling station capable of bi-directional transmission. A main channel card receives base-band signals from the back-haul interference module and then converts the base-band signals into middle frequency signals. A middle frequency module receives the middle frequency signals from the main channel card and then re-directs the middle frequency signals to a radio frequency module. However, the middle frequency module is also capable of receiving middle frequency signals from the radio frequency module. A plurality of reception channel cards is capable of receiving middle frequency signals from the middle frequency module and converting the middle frequency signals into base-band signals to be transmitted to the back-haul interface module. A random access card receives middle frequency signals from the middle frequency module for searching out a user's electronic network when the user's mobile telephone is switched on. A clock module generates timing signals to the reception channel cards and the random access card. A cell controller is responsible for controlling the operation of the base station. The cell controller is capable of sending control signals to the reception channel cards and the clock module or receiving control signals from the reception channel cards and the clock module.

In brief, this invention provides a CDMA system having a separate function channel card architecture. The system includes a main channel card responsible for controlling signal transmission while ordinary channel cards are responsible for signal reception. By separately processing data at a reception terminal and a transmission terminal, data that need to be swapped between a transmission device and a reception device can be transferred using extra buses. Consequently, similar computations can be processed as groups so that hardware design of the system is very much simplified and signal interference is greatly reduced.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
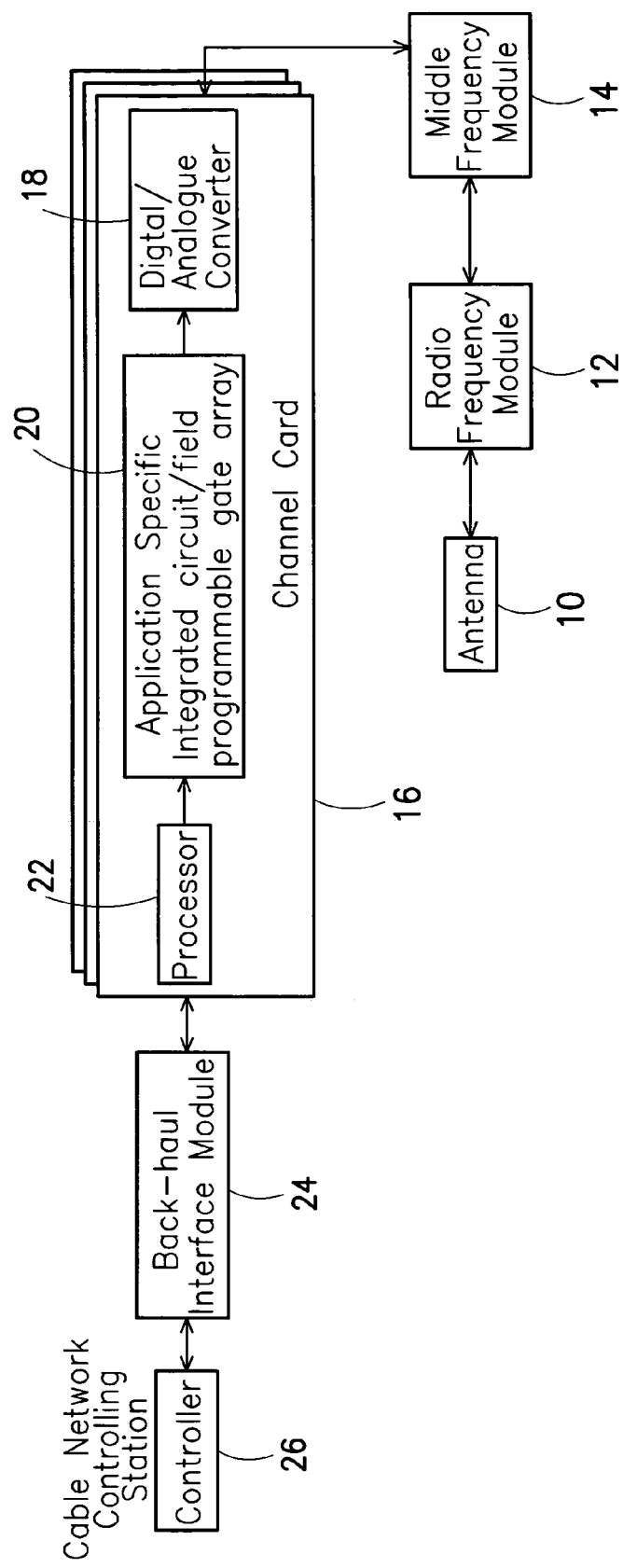
FIG. 1 is a block diagram showing a conventional CDMA system.

Reference will now be made in detail to the present preferred embodiments of the invention, examples of which are illustrated in the accompanying drawings. Wherever possible, the same reference numbers are used in the drawings and the description to refer to the same or like parts.

Figure 2:
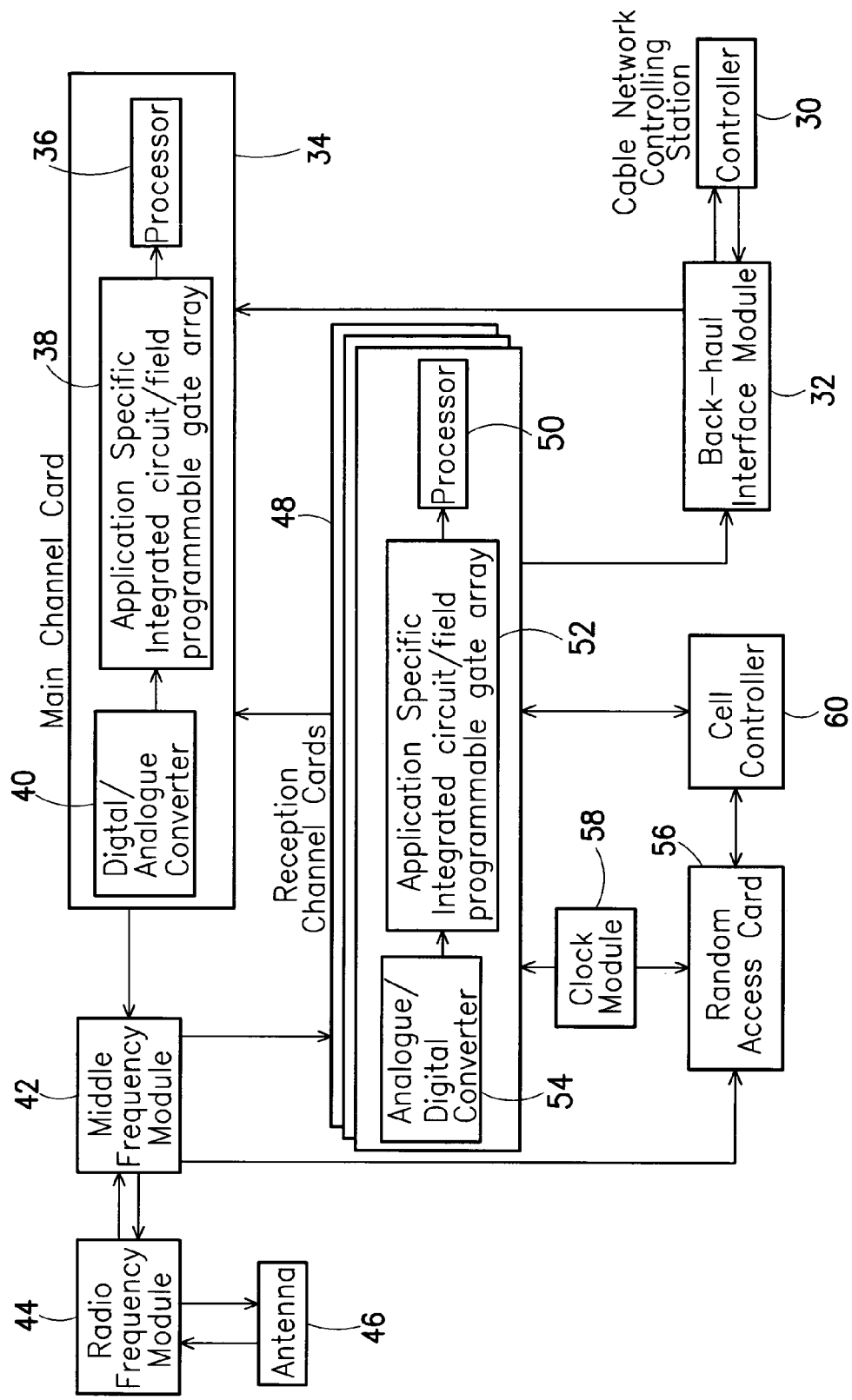
FIG. 2 is a block diagram showing a CDMA system according to this invention.

FIG. 2 is a block diagram showing a CDMA system according to this invention. As shown in FIG. 2, a back-haul interface module 32 is connected to a controller 30 of a cable network controlling station for bi-directional base-band digital signal transmission. The controller 30 functions in a similar way to a packet switcher.

A main channel card 34 receives base-band digital signals from the back-haul interface module 32 and then converts the base-band digital signals to middle frequency signals. The main channel card 34 includes a processor 36, an application specific integrated circuit/field programmable gate array 38 and a digital/analogue converter 40. The processor 34 executes functions that includes cyclic redundancy check, convolution encoding, rate matching and interleave encoding. The application specific integrated circuit/field programmable gate array 38 executes power control functions and spread encoding. The application specific integrated circuit/field programmable gate array 38 further includes a combining module and a modulation module. The digital/analogue converter 40 converts the base-band digital signals into middle frequency signals.

A middle frequency module 42 receives middle frequency signals from the main channel card 34 and then transmits the middle frequency signals to a radio frequency module 44. At the same time, the middle frequency module 42 is capable of receiving middle frequency signals from the radio frequency module 44. Furthermore, the radio frequency module 44 can transmit signals through an antenna 46 or receive signals from the antenna 46. In addition, the radio frequency module 44 is capable of swapping radio frequency signals and middle frequency signals.

A plurality of reception channel cards 48 receives middle frequency signals from the middle frequency module 42 and converts the middle frequency signals into base-band digital signals. The base-band digital signals are transmitted to the back-haul interface module 32. Each reception channel card 48 includes a processor 50, an application specific integrated circuit/field programmable gate array 52 and an analogue/digital converter 54. The processor 50 performs cyclic redundancy check decoding, Viterbi decoding, rate matching decoding, interleave decoding, power control functions and bus connection between channel card and channel master. The application specific integrated circuit/field programmable gate array 52 includes a combining module and a RAKE receiver. The application specific integrated circuit/field programmable gate array 52 performs various functions including demodulation, de-spreading, peak detection, Gold/Walsh code generation, channel estimation and receiver synchronization. The analogue/digital converter 54 converts middle-frequency analogue signals into base-band digital signals.

A random access card 56 receives middle frequency signals from the middle frequency module 42 for searching a particular user's electronic network when the user switches on a mobile telephone. A clock module 58 generates a timing signal to the reception channel cards 48 and the random access card 56. A cell controller 60 is capable of outputting control signals to the reception channel cards 48 and the clock module 58 and inputting control signals from the reception channel cards 48 and the clock module 58. The cell controller 60 controls the transmission of signals from the base station and the reception of signals into the base station.

Figure 3:
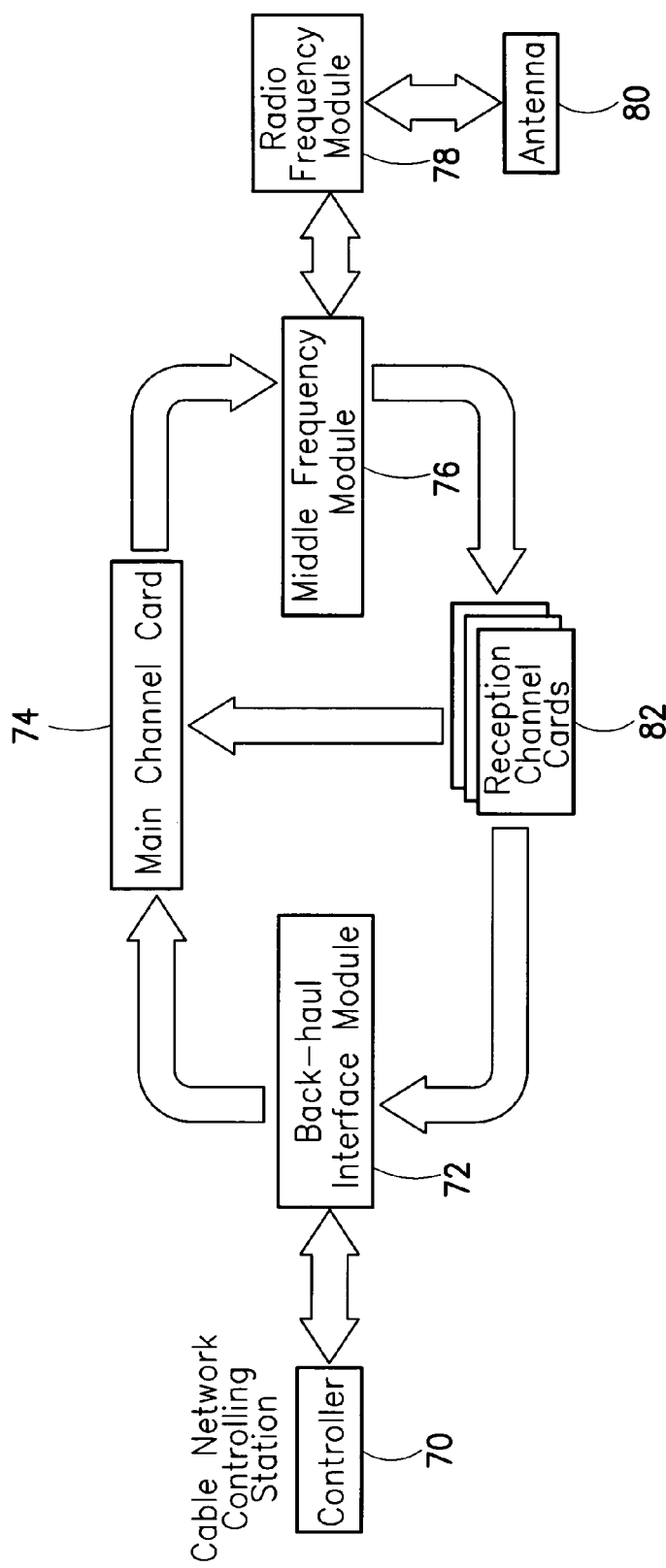
FIG. 3 is a simplified block diagram showing the operation of the CDMA system according to this invention.

FIG. 3 is a simplified block diagram showing the operation of the CDMA system according to this invention. As shown in FIG. 3, when the CDMA system serves as a signal emitter, a controller 70 of a cable network controlling station transmits base-band digital signals to a back-haul interface module 72. The back-haul interface module 72 outputs base-band digital signals to a main channel card 74. The main channel card 74 outputs middle-frequency analogue signals to a middle frequency module 76. The middle frequency module 76 outputs the middle-frequency analogue signals to a radio frequency module 78. The radio frequency module 78 outputs radio signals to an antenna 80. Finally, the antenna 80 emits radio frequency signals to various users of mobile telephones.

On the other hand, when the CDMA system serves as a signal receiver, the antenna 80 picks up signals emitted from the mobile telephones of various users. The antenna 80 transfer the received signals to the radio frequency module 78. The radio frequency module 78 outputs middle-frequency analogue signals to the middle frequency module 76. The middle frequency module 76 outputs the middle-frequency analogue signal to the reception channel cards 82. The reception channel cards 82 output base-band digital signals to the back-haul interface module 72. Finally, the back-haul interface module 72 outputs base-band digital signals to the controller 70 of the cable network controlling station.

In summary, this invention provides a CDMA system having a separate function channel card architecture. The system includes a main channel card responsible for controlling signal transmission while ordinary channel cards are responsible for signal reception. By separately processing data at a reception terminal and a transmission terminal, data that need to be swapped between a transmission device and a reception device can be transferred using extra buses. Consequently, similar computations can be processed as groups so that hardware design of the system is very much simplified and signal interference is greatly reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A code division multiple access (CDMA) system having a separate channel card architecture, comprising:
   a back-haul interface module connected to a controller of a cable network controlling station for bi-directional base-band digital signal transmission;
   a main channel card for receiving the base-band signals from the back-haul interface module and converting the base-band signals into middle frequency signals;
   a middle frequency module for receiving the middle frequency signals from the main channel card and outputting the middle frequency signal to a radio frequency module, or receiving middle frequency signals from the radio frequency module;
   a reception channel card for receiving middle frequency signals from the middle frequency module, converting the middle frequency signals into base-band signals and outputting the base-band signals to the back-haul interface module;
   a random access card for receiving middle frequency signals from the middle frequency module so that a user's electronic network can be found when the user's mobile telephone is switched on;
   a clock module for generating a timing signal to the reception channel card and the random access card; and
   a cell controller for outputting control signals to the reception channel card and the clock module or inputting control signals from the reception channel card and the clock module to control the operations of the base station.

2. The CDMA system of claim 1, wherein the main channel card further includes a processor, an application specific integrated circuit/field programmable gate array and a digital/analogue converter.

3. The CDMA system of claim 2, wherein the processor performs functions that include cyclic redundancy check, convolution encoding, rate matching and interleave encoding.

4. The CDMA system of claim 2, wherein the application specific integrated circuit/field programmable gate array performs functions that include power control and code spreading, and the application specific integrated circuit/field programmable gate array further includes a combining module and a modulation module.

5. The CDMA system of claim 1, wherein the radio frequency module outputs radio frequency signals to an antenna or receives radio frequency signals from the antenna followed by converting the radio frequency signals into middle frequency signals.

6. The CDMA system of claim 1, wherein the reception channel card further includes a processor, an application specific integrated circuit/field programmable gate array and an analogue/digital converter.

7. The CDMA system of claim 6, wherein the processor performs functions that include cyclic redundancy check decoding, Viterbi decoding, rate matching decoding, interleave decoding, power control and bus connection between channel card and channel master.

8. The CDMA system of claim 6, wherein the application specific integrated circuit/field programmable gate array further includes a combining module and a RAKE receiver and the application specific integrated circuit/field programmable gate array performs functions that include demodulation, de-spreading, peak detection, Gold/Walsh code generation, channel estimation and receiver synchronization.

* * * * *